(12) United States Patent
Zhang et al.

(10) Patent No.: US 8,607,856 B2
(45) Date of Patent: Dec. 17, 2013

(54) CABLE HEAD FOR PETROLEUM LOGGING

(75) Inventors: Guoan Zhang, Shaanxi (CN); Jiafu Zhang, Shaanxi (CN); Jianlong Cheng, Shaanxi (CN)

(73) Assignee: Tong Oil Tools Co., Ltd., Xi'an (CN)

( * ) Notice: Subject to any disclaimer, the term of this patent is extended or adjusted under 35 U.S.C. 154(b) by 227 days.

(21) Appl. No.: 13/203,802

(22) PCT Filed: Mar. 11, 2010

(86) PCT No.: PCT/CN2010/070987
§ 371 (c)(1),
(2), (4) Date: Aug. 29, 2011

(87) PCT Pub. No.: WO2010/102572
PCT Pub. Date: Sep. 16, 2010

(65) Prior Publication Data
US 2011/0318088 A1 Dec. 29, 2011

(30) Foreign Application Priority Data
Mar. 12, 2009 (CN) .......................... 2009 1 0021510

(51) Int. Cl.
*E21B 17/10* (2006.01)
(52) U.S. Cl.
USPC .............. 166/65.1; 166/242.6; 403/2
(58) Field of Classification Search
USPC .......... 166/65.1, 242.6, 242.7; 403/2
See application file for complete search history.

(56) References Cited

U.S. PATENT DOCUMENTS

| | | | | |
|---|---|---|---|---|
| 2,640,546 A | * | 6/1953 | Baker | 166/125 |
| 3,186,455 A | * | 6/1965 | Stoll | 144/246.1 |
| 4,648,444 A | | 3/1987 | Busch | |
| 4,697,641 A | | 10/1987 | White | |
| 5,201,814 A | | 4/1993 | Kitchell et al. | |
| 6,431,269 B1 | | 8/2002 | Post et al. | |

FOREIGN PATENT DOCUMENTS

| | | |
|---|---|---|
| CN | 2081883 U | 7/1991 |
| CN | 2275160 Y | 2/1998 |
| CN | 2554352 Y | 6/2003 |

(Continued)

*Primary Examiner* — William P Neuder
(74) *Attorney, Agent, or Firm* — IM IP Law PLLC; C. Andrew Im

(57) ABSTRACT

A cable head for petroleum logging includes a first connector and a second connector; there is a tension rod between the first connector and the second connector; a first piston, a second piston and a third piston are successively provided on the upper part, the middle part and the lower part of the first connector; the diameter of the second piston is greater than the diameters of the first and third piston respectively; the first and second piston are sealed and mounted inside a first cylinder; the third piston is sealed and mounted inside a second cylinder; the lower part of the second cylinder is fixedly connected with the second connector; a balance cavity is formed between the lower end face of the second piston and the upper end face of the second cylinder when the lower end face of the first cylinder is contacted with the upper end face of second cylinder; the balance cavity communicates with the external by a passage on the first or second cylinder; an axial projected area of the lower end face of the second piston is equal to a cross section area of the first piston. When the cable head is stuck in the well in use, the logging cable can be disconnected by breaking the tension rod, thus it is no need to overcome the pressure of fluid in the deep well.

8 Claims, 4 Drawing Sheets

(56) References Cited

FOREIGN PATENT DOCUMENTS

| | | |
|---|---|---|
| CN | 2628727 Y | 7/2004 |
| CN | 2641287 Y | 9/2004 |
| CN | 200952391 Y | 9/2007 |
| CN | 201358779 Y | 12/2009 |
| EP | 1489259 A2 | 12/2004 |
| WO | WO 2004/046497 A1 | 6/2004 |

* cited by examiner

CABLE HEAD FOR PETROLEUM LOGGING

RELATED APPLICATIONS

The present application is national phase of International Application No. PCT/CN2010/070987, entitled "CABLE HEAD FOR PETROLEUM LOGGING", filed on Mar. 11, 2010, which claims the benefit of priority to Chinese patent application No. 200910021510.6entitled "CABLE HEAD FOR PETROLEUM LOGGING", filed with the Chinese State Intellectual Property Office on Mar. 12, 2009. The entire disclosure thereof are incorporated herein by reference in their entireties.

TECHNICAL FIELD OF THE INVENTION

The present invention relates to a device for petroleum logging, in particular to a cable head for petroleum logging.

BACKGROUND OF THE INVENTION

A cable head used in petroleum logging is a connection apparatus between a logging cable and a logging instrument. A conventional cable head for petroleum logging includes a coupling sleeve, an upper joint, a lower joint and a housing. A tension rod is connected between the two joints. The coupling sleeve is connected with the upper joint, and the housing is connected with the lower joint. In use, the logging cable and the logging instrument are connected with the coupling sleeve and the lower joint respectively, and the cable head is filled with silicone grease, which causes a lot of trouble in assembly, disassembly and maintenance.

In view of this, Chinese patent CN 2641287 discloses an electrode, cable logging cable head including a main joint and an inner torpedo, in which two ends of the tension rod are fixed between the main joint and the inner torpedo respectively, and a fully-sealed measure is employed between the connecting parts. Thus, there is no need to fill the silicone grease in the cable head in use.

In logging, the cable head is sometimes stuck in the well due to failure in operation. At this moment, the logging cable is needed to be disconnected from the cable head for recovering the logging cable, and the current method is to break the tension rod in the cable head by pulling the logging cable. It is well known that, the breaking force of the tension rod is designed based on the safe tension force which is applied to the logging cable. In order to break the tension rod, the cable of the above cable head have to first overcome the forces applied on the joints of the cable head by various fluids (for example oil, water or mud, etc) in the well. However, since the operation failure often happens at one or several kilometers depth in the well, the force applied on the cable head by various fluids in the well is very great. For example, at the depth of 1 km to 1.5 km in the well, the force applied on the upper joint by the fluid is approximately equal to the breaking force of the tension rod, and in this case, the actual tension force of the logging cable is required to be twice as much as the set tension force to break the tension rod. In particular, as the depth of the well increases, the actual tension force of the cable would increase accordingly.

Apparently, when the logging cable head is stuck in the well, the logging cable head with the conventional structure has disadvantages such as damage or even discard of the logging cable.

SUMMARY OF THE INVENTION

The problem to be solved by the present invention is to provide a cable head for petroleum logging, in which the logging cable may be disconnected only under a set tension force for breaking the tension rod when the cable head is stuck in the well.

The technical solution for solving the above problem is to provide a cable head for petroleum logging including a first connector and a second connector which are fixedly connected with two ends of a tension rod respectively. The inventive point of the present invention is that, a upper portion, a middle portion and a lower portion of the first connector are provided with a first piston, a second piston and a third piston sequentially, with a diameter of the second piston is larger than diameters of the first piston and the third piston; the first piston and the second piston of the first connector are disposed in the first cylinder which has inner cavities slidably fitted with the first piston and the second piston respectively; the third piston of the first connector is disposed in the second cylinder, a lower portion of the second cylinder is fixedly connected with the second connector; a balance cavity is formed between a lower end face of the second piston of the first connector and an upper end face of the second cylinder when a lower end face of the first cylinder abuts against the upper end face of the second cylinder, and the balance cavity communicates with the external through a passage in the first cylinder or the second cylinder; and an axial projected area of the lower end face of the second piston of the first connector is equal to a cross section area of the first piston.

Preferably, sealing members are provided between fitting surfaces of the first cylinder, the first piston and the second piston, respectively, and a sealing member is provided between fitting surfaces of the third piston and the second cylinder.

Preferably, the second piston of the firs connector includes a split connecting ring and a piston bush. The split connecting ring is inserted and locked in a groove of the body of the first connector. The piston bush is mounted outside the body of the first connector and is integrally connected with the split connecting ring with screws. Sealing members are provided between the fitting surfaces of the piston bush, the first connector and the first cylinder.

Preferably, the passage is a through hole in the first cylinder.

Preferably, the passage is a groove in the lower end face of the first cylinder or in the upper end face of the second cylinder.

Preferably, a through hole is provided in a sidewall of the first connector between the first piston and the second piston to communicate the inner cavity of the first cylinder above the second piston with a central cavity of the first connector.

Preferably, the tension rod may be a bolt-like shape with a head portion. A threaded portion of a lower end of the tension rod is screwed into and fixed with a threaded hole of a top portion of the second connector through an axial through hole of a bottom portion of the first connector.

Preferably, the tension rod may be a bolt-like shape with a head portion. A threaded portion of an upper end of the tension rod is screwed into and fixed with a threaded hole of a bottom portion of the first connector through an axial through hole of a top portion of the second connector.

In logging operation, the logging cable is fixed on a sealing joint which is connected with the first connector of the cable head, and the logging instrument is mounted on the second connector of the cable head.

Since the first piston and second piston of the first connector is fitted in the first cylinder and the third piston is fitted in the second cylinder, the portions where the first connector contacts with the fluid in the well include the upper end of the first connector and the lower end face of the second piston, while a lower end face of the first piston, a upper end face of the second piston and upper and lower end faces of the third piston do not contact with the fluid in the well. When the cable head is stuck in the well, i.e. the second cylinder (equivalent to a housing of the cable head) or the second connector of the cable head is stuck in the well, since the axial projected area of the lower end face of the second piston is equal to the cross section area of the first piston, a resultant force applied on the first connector (including the sealing joint) by the fluid in the well can be zero, i.e. the pressing force applied on the upper end of the first connector by the fluid in the well and the pressing force applied on the lower end face of the second piston by the fluid in the well are counterbalanced. In this case, the tension force from the logging cable is entirely applied on the tension rod through the sealing joint and the first connector.

In the present invention, the first cylinder and the second cylinder are fitted with the first connector having three pistons, so as to realize the purpose that the tension force from the logging cable is entirely applied on the tension rod without being influenced by the pressure of the fluid in the well, thereby ensuring that the logging cable would not be damaged when eliminating the failure of sticking in the well. The cable head according to the present invention has simple structure and a high safety.

In another preferable technical solution of the present invention, there are sealing connections between the cylinders and the pistons, and thus there is no need to fill the silicone grease in the cable head in use, which avoids the cleaning of the silicone grease in disassembly or maintenance, and facilitates the operation of the logging and makes the connection of the logging cable more convenient.

DETAILED DESCRIPTION OF THE INVENTION

Figure 1:
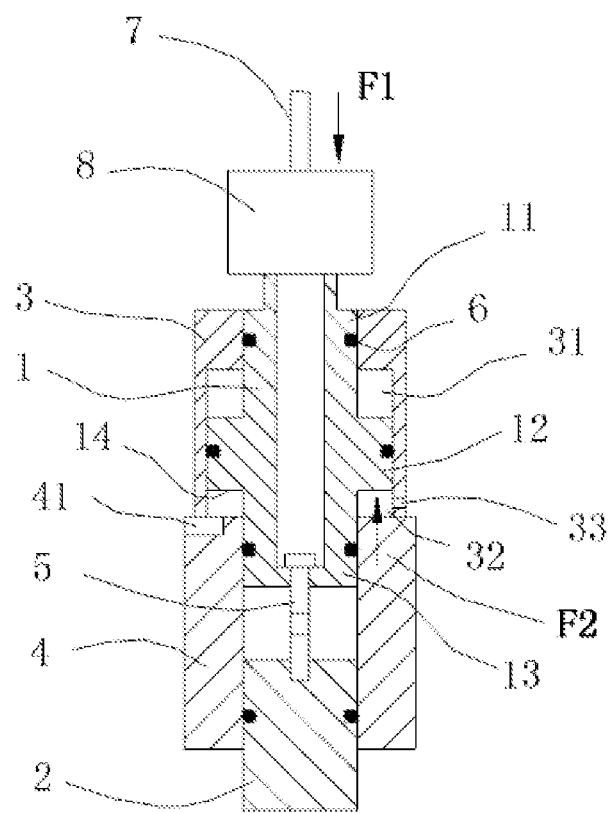
FIG. 1 is a structural principle view of the present invention.

Hereinafter, the embodiments of the present invention will be further described in detail with reference to the drawings.

First, with reference to FIG. 1, the structural principle of the present invention will be explained. For facilitating the description, detailed structures inside a cable head are not drawn in FIG. 1, for example, a fixing and connecting structure of a tension rod, and an electrical connecting structure of a logging cable, and the connecting structure between the logging cable and the sealing joint is not drawn in FIG. 1.

The cable head of the present invention mainly includes a first connector 1, a second connector 2, a first cylinder 3, a second cylinder 4 and a tension rod 5. The first connector 1 has three pistons, i.e., a first piston 11 located at the upper portion of the first connector, a second piston 12 located at the middle portion of the first connector and a third piston 13 located at the lower portion of the first connector, with the diameter of the second piston 12 being largest. The first cylinder 3 is mounted outside the first piston 11 and the second piston 12, and sealing members 6 are provided between their fitting surfaces to prevent fluid in a well from entering into a first cylinder cavity 31 located above the second piston, so that a upper end face of the second piston 12 would not be subjected to the pressure of the fluid in the well. The third piston 13 of the first connector is fitted at the upper portion of a second cylinder 4 which is equivalent to a housing of the cable head, and a sealing member is also provided between their fitting surfaces. A screwed and sealed connection is provided between the lower portion of the second cylinder 4 and the second connector 2. The tension rod 5 connects the first connector 1 and the second connector 2. A cavity 32 is formed between the lower end face of the second piston and the upper end face of the second cylinder when the lower end face of the first cylinder 3 contacts with the upper end face of the second cylinder 4, and the cavity 32 is defined as a balance cavity 32 in the present application. The cavity 32 communicates with the external via a passage, and the passage may be in many forms, for example a through hole 33 in the first cylinder, or a groove 41 in the lower end face of the first cylinder or the upper end face of the second cylinder.

In logging operation, the logging cable 7 is connected to a sealing joint 8, and the lower end of the sealing joint is connected to the first connector 1 of the cable head, and a logging instrument is connected to the lower end of the second connector 2. After the cable head enters into the oil well, the first cylinder 3 is subjected to the pressure of the fluid in the well and tends to slide downwardly, so that its lower end face is always pressed on the upper end face of the second cylinder 4. If the second cylinder 4 of the cable head is stuck in the well, two forces are applied on the first connector 1 along the axial direction of the cable head by the fluid in the well, specifically, one is a downward pressing force F1 applied on the upper end of the first connector, and the other is a upward pressing force F2 applied on the lower end face 14 of the second piston by the fluid in the well entering into the balance cavity 32 through the through hole 33 or the groove 41. Since the sealing joint 8 is integrally connected with the first connector 1 and is completely immerged in the fluid, and the logging cable is connected with the sealing joint by hitching a traction wire of the logging cable in the sealing joint, the area of the pressing force F1 applied on the upper end of the first connector is equal to the cross section area of the first piston 11. For the pressure at one or several kilometers depth in the well, the pressure of the fluid in the well caused by the difference in height between the top end of the cable head and the lower end face of the second piston is negligible. Thus, as long as the area of the annular face of the lower end face of the second piston 12 is equal to the cross section area of the first piston 11, it is possible to allow the pressing force F1 to be equal to the pressing force F2, i.e. the resultant force applied on the first connector by the fluid in the well is equal to zero.

It should be noted that, the resultant pressing force applied on the first cylinder is entirely transmitted to the second cylinder. After the cable head is stuck, frictions between three pistons of the first connector and the cylinders are also needed to be overcome when pulling the first connector upwardly through the logging cable. Compared with the breaking force of the tension rod, the frictions are negligible. Besides, as mentioned above, the pressure of the fluid in the well caused by the difference in height between the top end of the cable head and the lower end face of the second piston is also negligible. It should be understood that, neglecting the above factors in engineering practice may simply design and operation, and the deviation caused by these factors may be deemed to be an allowable error. The applicant states that, the technical solution involving these factors should also be deemed to fall into the protection scope of the present application.

Figure 2:
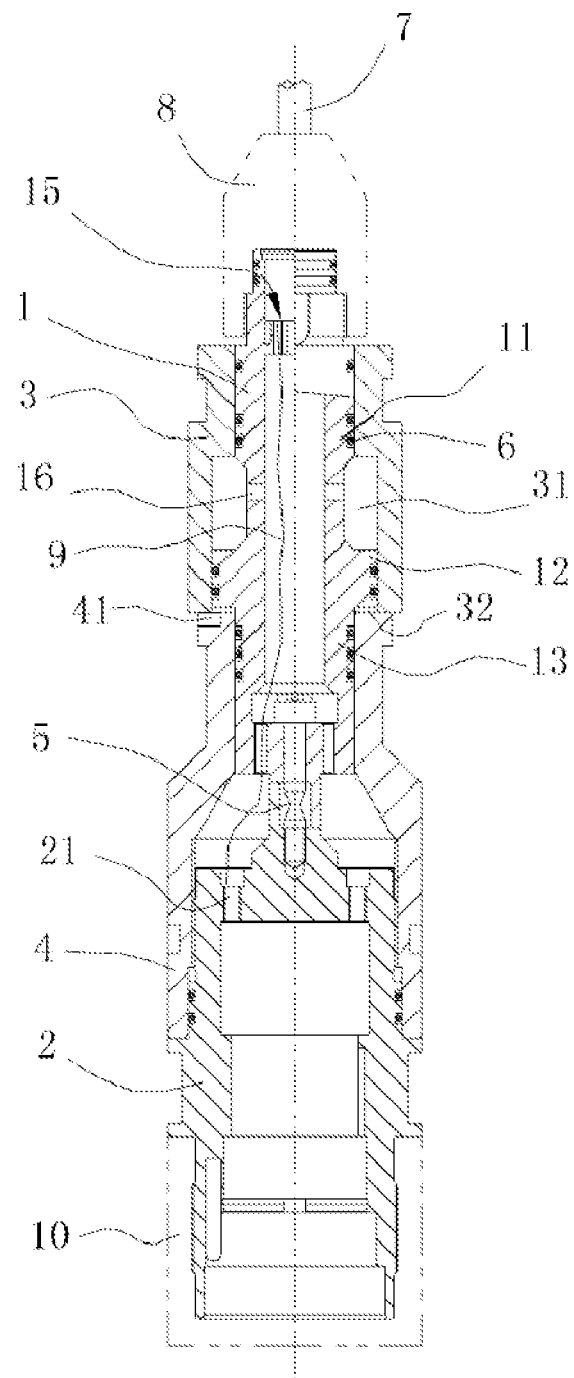
FIG. 2 is a view of a structure of a first embodiment according to the present invention.

A specific embodiment designed according to the structure in FIG. 1 is shown in FIG. 2. The cable head includes the first connector 1, the second connector 2, the first cylinder 3, the second cylinder 4 and the tension rod 5. The first connector 1 has three pistons thereon, i.e., the first piston 11, the second piston 12 and the third piston 13, and sealing members 6 are provided between each of the pistons and each of the cylinders. There is a screwed and sealed connection between the second cylinder 4 and the second connector 2. The groove 41 is provided at the upper end face of the second cylinder and communicates the cavity between the first connector and the second cylinder with the external, so that the fluid in the well may enter into the cavity 32 below the second piston to generate an upward balance pressing force (i.e. the pressing force F2 in FIG. 1). The tension rod 5 is designed into a bolt-like shape with a head portion, and passes through a hole in the bottom of the first connector, with its lower end portion being screwed into a threaded hole in the top of the second connector. In operation, the traction wire and conducting wire of the logging cable 7 are connected with the sealing joint 8, and a plug of the conducting wire of the cable is inserted into a socket 15. The upper end of a conducting wire 9 is connected with the socket 15, and the other end thereof is connected to a sealed terminal 21 of the second connector through the through hole of the first connector.

In addition, the through hole 16 is provided in the wall of the first connector between the first piston and the second piston, to communicate an inner cavity 31 of the first cylinder above the second piston with the central cavity of the first connector. The function of the through hole 16 is to communicate the cavities inside the cable head with each other, so as to ensure that the performance of safely breaking the tension rod 5 is kept constant especially in the case of sealing failure.

In operation, the logging cable 7 is connected with the sealing joint 8, the sealing joint 8 is connected with a threaded fitting of the upper end of the first connector, and the logging instrument is connected to the second connector 2 via a sealing fitting 10.

Figure 3:
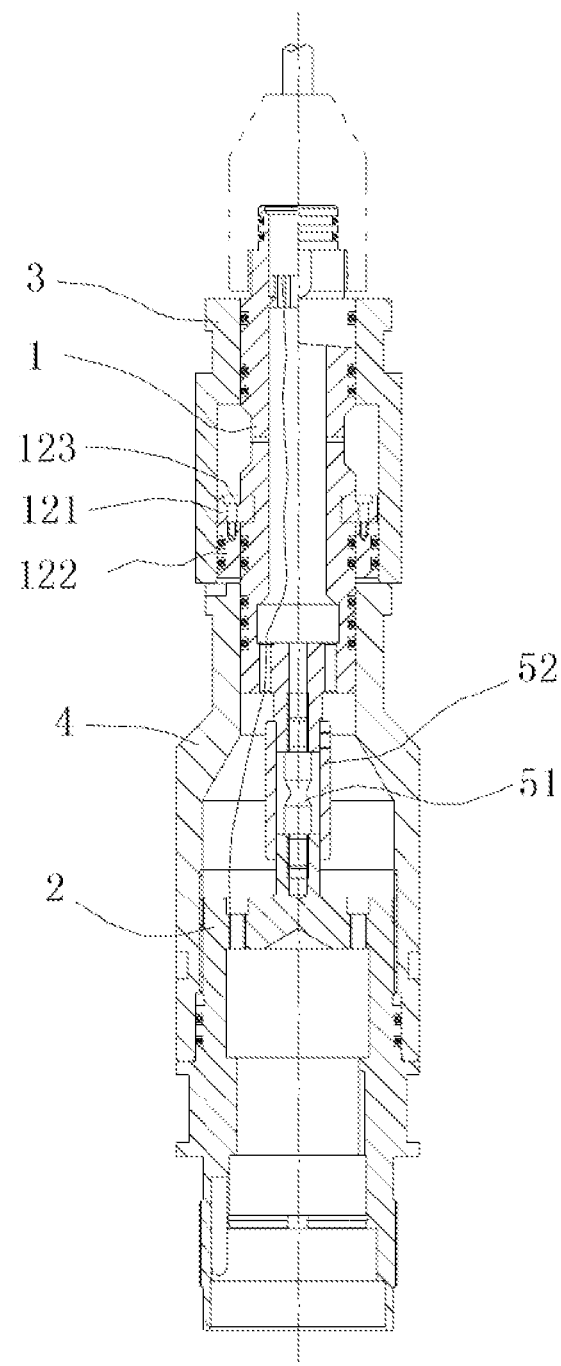
FIG. 3 is a view of a structure of a second embodiment according to the present invention.

Another embodiment of the present invention is shown in FIG. 3. The second piston 12 of the first connector is configured such that it includes a split connecting ring 121 and a piston bush 122. The split connecting ring 121 is inserted and locked in a groove of the body of the first connector 1, and the piston bush 122 is mounted outside the body of the firs connector and is integrally connected with the split connecting ring 121 with screws 123. Sealing members are provided between the fitting surfaces of the piston bush, the first connector and the first cylinder. Two ends of the tension rod 51 are threaded rods which are connected to the first connector 1 and the second connector 2 respectively, and a hexagon sleeve 52 is further provided at the periphery of the tension rod 51. The other structures are the same as the previous embodiment.

Figure 4:
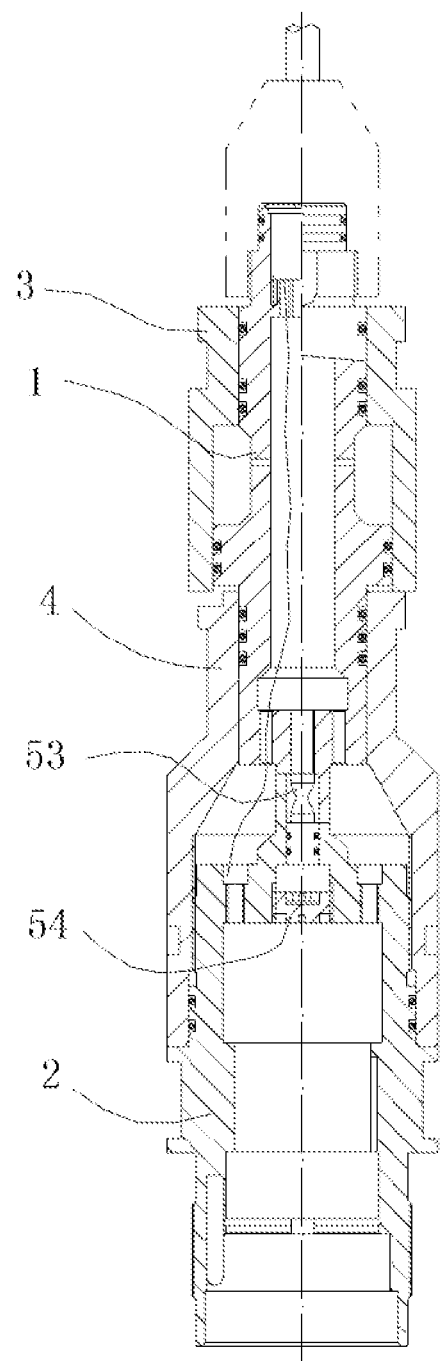
FIG. 4 is a view of a structure of a third embodiment according to the present invention.

The third embodiment of the present invention is shown in FIG. 4. The tension rod 53 is assembled in a rear-mounted mode, i.e. the upper end of the tension rod 53 is a threaded rod which connects with the bottom of the first connector 1 through a hole of the second connector 2, and the lower end of the tension rod 53 is sealed and fixed with a screw plug 54. The other structures are the same as the embodiment shown in FIG. 2.

What is claimed is:

1. A cable head for petroleum logging, comprising a first connector and a second connector which are fixedly connected with two ends of a tension rod respectively, wherein a first piston, a second piston and a third piston are provided sequentially at an upper portion, a middle portion and a lower portion of the first connector, a diameter of the second piston is larger than diameters of the first piston and the third piston;

the first piston and the second piston of the first connector are disposed in a first cylinder which has inner cavities slidably fitted with the first piston and the second piston respectively; the third piston of the first connector is disposed in a second cylinder, and a lower portion of the second cylinder is fixedly connected with the second connector;

a balance cavity is formed between a lower end face of the second piston of the first connector and an upper end face of the second cylinder when a lower end face of the first cylinder abuts against the upper end face of the second cylinder;

an axial projected area of the lower end face of the second piston of the first connector is equal to a cross section area of the first piston; and wherein either the first cylinder or the second cylinder comprises a passage to the balance cavity.

2. The cable head for petroleum logging according to claim 1, wherein sealing members are provided between fitting surfaces of the first cylinder, the first piston and the second piston, respectively, and a sealing member is provided between fitting surfaces of the third piston and the second cylinder.

3. The cable head for petroleum logging according to claim 1, wherein the second piston of the first connector comprises a split connecting ring and a piston bush; the split connecting ring is inserted and locked in a groove of a body of the first connector; the piston bush is mounted outside the body of the first connector and is integrally connected with the split connecting ring with screws; sealing members are provided between fitting surfaces of the piston bush, the first connector and the first cylinder.

4. The cable head for petroleum logging according to claim 1, wherein the passage is a through hole in the first cylinder.

5. The cable head for petroleum logging according to claim 1, wherein the passage is a groove in the lower end face of the first cylinder or in the upper end face of the second cylinder.

6. The cable head for petroleum logging according to claim 5, wherein a through hole is provided in a sidewall of the first connector between the first piston and the second piston, to communicate the inner cavity of the first cylinder above the second piston with a central cavity of the first connector.

7. The cable head for petroleum logging according to claim 6, wherein the tension rod is of a bolt-like shape with a head portion, and a threaded portion of a lower end of the tension rod is screwed into and fixed with a threaded hole of a top portion of the second connector through an axial through hole of a bottom portion of the first connector.

8. The cable head for petroleum logging according to claim 6, wherein the tension rod is of a bolt-like shape with a head portion, and a threaded portion of an upper end of the tension rod is screwed into and fixed with a threaded hole of a bottom portion of the first connector through an axial through hole of a top portion of the second connector.

* * * * *